United States Patent [19]

Reid

[11] Patent Number: 4,586,333
[45] Date of Patent: May 6, 1986

[54] WATER ENGINE

[75] Inventor: Alister U. Reid, East Horsley, England

[73] Assignee: Aur Hydropower Limited, London, England

[21] Appl. No.: 663,877

[22] Filed: Oct. 23, 1984

Related U.S. Application Data

[63] Continuation of Ser. No. 343,910, Jan. 29, 1982, abandoned.

[30] Foreign Application Priority Data

Feb. 13, 1981 [GB] United Kingdom ................. 8104507

[51] Int. Cl.$^4$ ............................................. E02B 13/12
[52] U.S. Cl. ..................................... 60/506; 417/332; 417/333
[58] Field of Search .................. 60/497, 506; 417/331, 417/332, 333

[56] References Cited

U.S. PATENT DOCUMENTS

| | | | |
|---|---|---|---|
| 582,282 | 5/1897 | Greiner | 417/332 |
| 930,536 | 8/1909 | Daily | 417/332 |
| 939,506 | 11/1909 | Hubmann | 417/332 |
| 4,295,800 | 10/1981 | Packer | 60/506 |

Primary Examiner—Allen M. Ostrager
Attorney, Agent, or Firm—Kenyon & Kenyon

[57] ABSTRACT

A water engine comprises a float arranged for reciprocal movement in a chamber under the action of a head of water. The chamber is filled with water from an upper level by means of a valve and is emptied to a lower level by means of a further valve. A cross-head is mounted atop the float and two pairs of hydraulic rams are pivotably connected to the crosshead. The pairs of rams are also pivotably connected to pairs of sliders which are adjustably mounted on stanchions. When the float is caused to rise, hydraulic fluid in the upper pair of rams is pressurized because of the shortening of the rams, while hydraulic fluid is drawn into the lower pair of rams by extension thereof. When the float is caused to fall, the opposite is true. Each pair of rams pivots as the float moves, the arrangement being such that for whichever pair of rams is on its working stroke there is progressively less shortening of that pair of rams per unit travel of the float.

15 Claims, 10 Drawing Figures

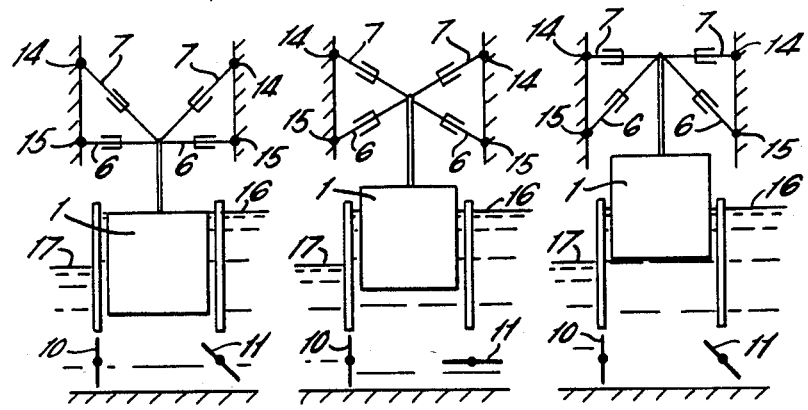
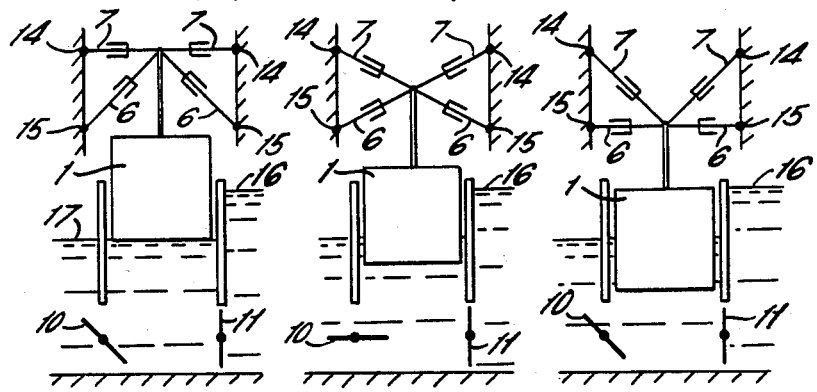

WATER ENGINE

This is a continuation of application Ser. No. 343,910, filed Jan. 29, 1982, now abandoned.

BACKGROUND OF THE INVENTION

This invention relates to a water engine having a reciprocating water driven member such as a float, for example a water engine of the type described in my GB Patent Specification No. 1484721.

In such engines, and in other similar water engines in which a float or piston is driven up and down by a head of water, the force generated by the water on the float or piston respectively is generally not constant, but varies in a more or less linear way throughout the stroke of the float or piston from an initial value to zero if dynamic effects are not significant. This variation in force available gives rise to a number of problems in extracting the available energy from the piston or float.

BRIEF SUMMARY OF THE INVENTION

This invention provides a water engine of the kind having a water driven member which is arranged for linear reciprocal movement under the action of water and means to provide a supply of fluid under pressure, comprising a variable length link, a piston and cylinder device in said link operable to work on the fluid on relative movement of the piston and cylinder which is caused by change in length of the link, means pivotally connecting the said link at one end to the water driven member and at the other end to a second point not reciprocable with the member, the said second point being spaced from the line of reciprocation of the water driven member, whereby said reciprocal movement of the water driven member alters the length of the link.

The water engine preferably includes a chamber located between upper and lower water levels, the water driven member preferably comprising a float positioned within the chamber, power means to be driven from the float, an inlet valve to control entry of water from the head of water into the chamber, and an outlet valve for controlling outlet of water from the chamber, float operated means being provided for controlling the operation of the inlet and outlet valves in response to the position of the float in the chamber, to cause the water level to rise and fall alternately to operate the float.

A preferred embodiment of the apparatus of the invention will now be described with reference to the accompanying drawings.

DETAILED DESCRIPTION OF THE PREFERRED EMBODIMENT

Figure 1:
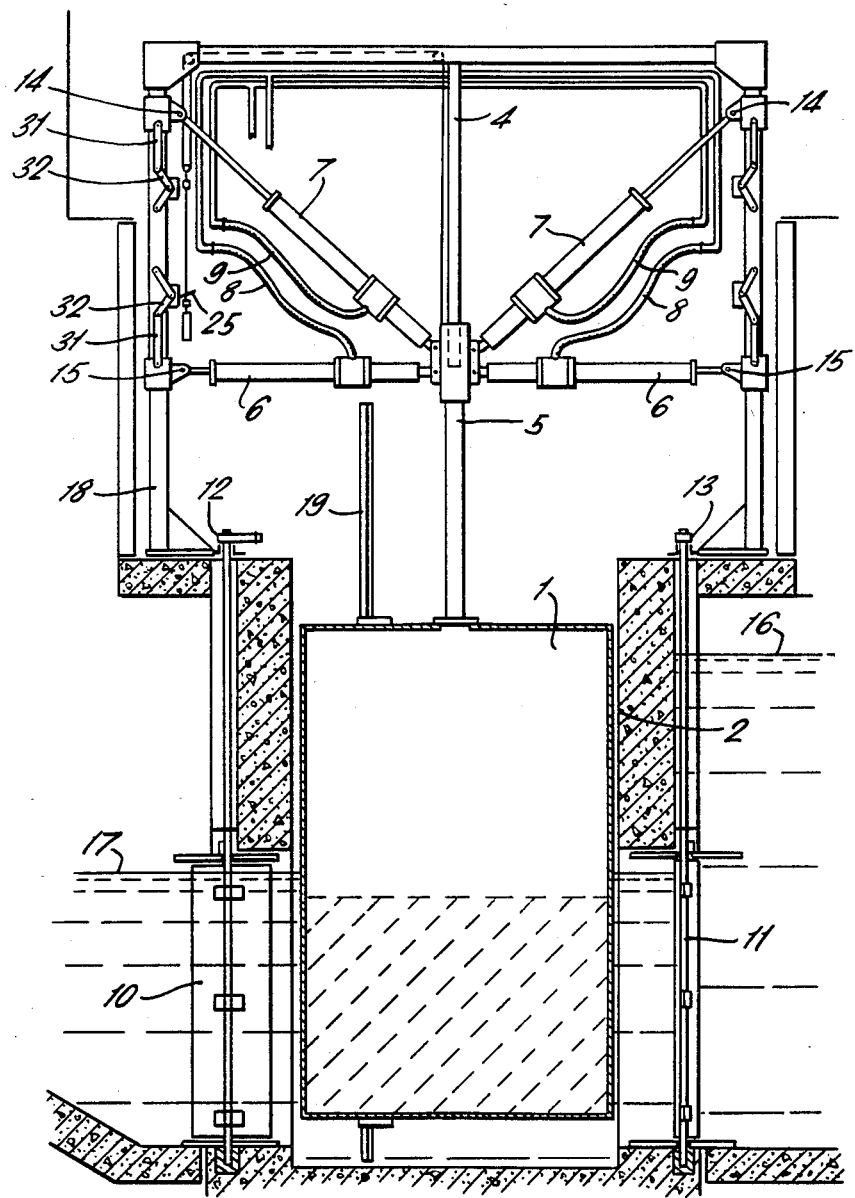
FIG. 1 is a schematic sectional elevation of an engine for extracting energy from a head of water of the order of a few feet, using a rising and falling float, shown in the lower position.
Figure 2:
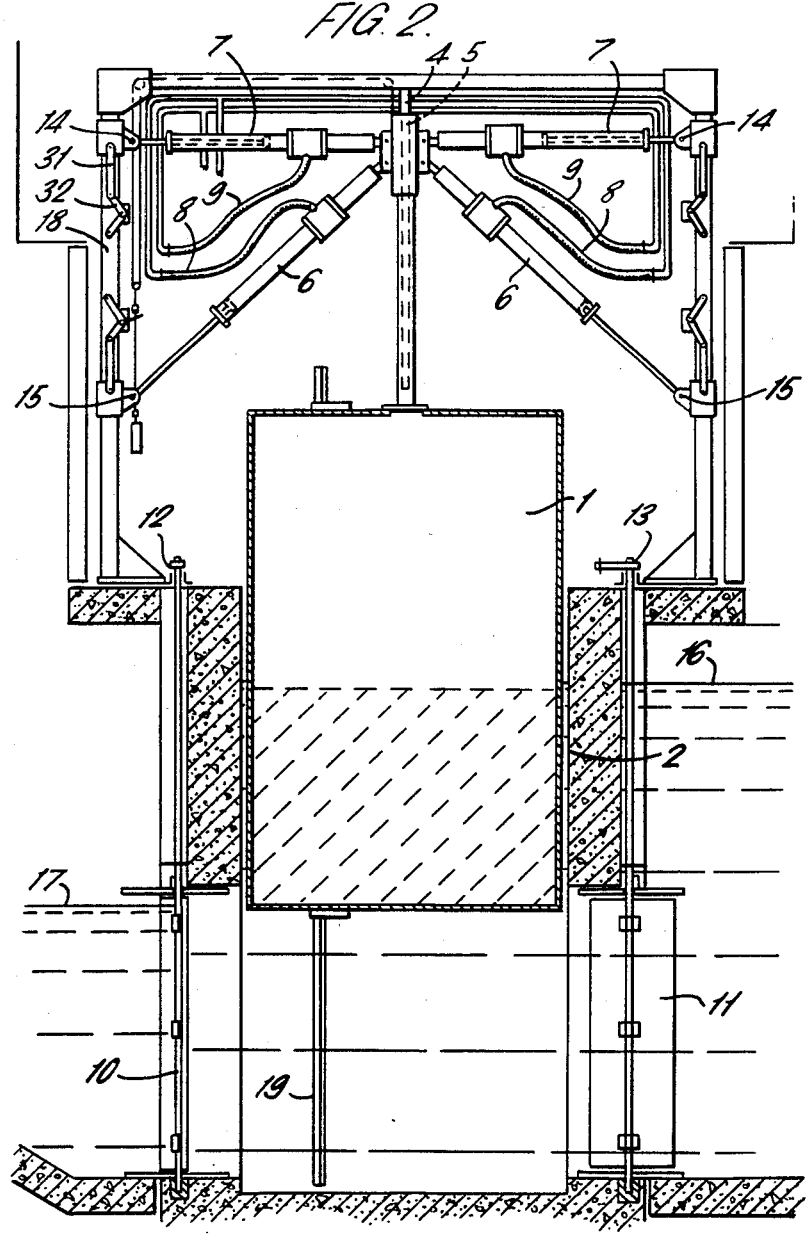
FIG. 2 is the same view as in FIG. 1, with the float in the upper position.

An engine, as shown in FIGS. 1 and 2, comprises a float 1 which is arranged to rise and fall in a chamber 2. The chamber 2 fills with water from a valve 11 under a head of water 16 and empties through valve 10 to a head of water 17. The chamber 2 may be in the form of a lock in a canal or river, for example, where there is already a usable head of water. Alternatively, special provisions may be made in order to achieve upper and lower water levels, by means such as a by-pass stream around a dam in a waterway.

The valves 10 and 11 shown in FIGS. 1 and 2 are butterfly valves, but it will be appreciated that any other known type of valve could equally well be used here. For example, a vertically sliding plate for each valve has been found to be an effective alternative.

The float 1 is annular and is of constant cross-section, preferably circular or rectangular. The float 1 occupies substantially all of the chamber volume. In static equilibrium, both the draft of the float and its height above the water line are greater than the difference in head between the upper and lower water levels 16 and 17. This enables the engine to work with the greatest possible efficiency, preventing the float being totally submerged, or being totally raised above the water. In practice, it may not be necessary for the draft and height above the water line to be greater than the difference in water levels yet still prevent the float submerging or, rising totally above the water level. Vertical guides 19 are provided for the float 1 in the walls of the chamber 2.

The float 1 is connected to a cross-head 5 which is free to slide on guide rod 4. The guide rod 4 forms the central axis along which the entire engine reciprocates, and guides 19 for the float are provided in the chamber wall. The guide rod 4 is supported at the top by a rigid structure in the form of a framework having a pair of stanchions 18. It may be necessary for the guide rod to extend to the bottom of the chamber.

Two pairs of hydraulic rams 6 and 7 are pivotally connected at one of their ends to the cross-head 5 and at the other of their ends to supports 14 and 15 respectively. In FIGS. 1 to 4 the ram cylinders are shown attached to the cross-head 5. It may be preferable in certain circumstances to attach the ram pistons to cross-head 5. The supports 14 and 15 are connected to pivotable arms 32 by links 31, and the arms 32 are hingedly fastened to the stanchions 18. The supports 14 and 15 are in the form of sleeves which can slide on stanchions 18. With this arrangement, the vertical position of the supports 14 and 15 on the stanchions 18 can be adjusted to suit the prevailing water levels 16 and 17. It will be appreciated that alternative ways of adjustably mounting the rams on the stanchions may be used.

A gate control switch 25, which is actuated by the rise and fall of the float 1, controls the operation of the valves 10 and 11. The switch 25 is mounted on the left-hand stanchion 18. The switch 25 comprises a lever arm in which there is a hole. A vertically depending rod passes through this hole in the lever arm and there is a block adjustably mounted on the rod on either side of the lever arm. The rod is linked to the cross-head 5 by means of a cable which runs over a series of pulleys mounted on the framework. A counterweight is attached to the end of the rod to ensure that the cable is kept in tension. This arrangement allows the on-off tripping points of the switch 25 to be adjustable with respect to the position of the float 1 at the ends of its stroke to suit the prevailing head conditions. It will be appreciated that other switching devices could be used.

Figure 5:
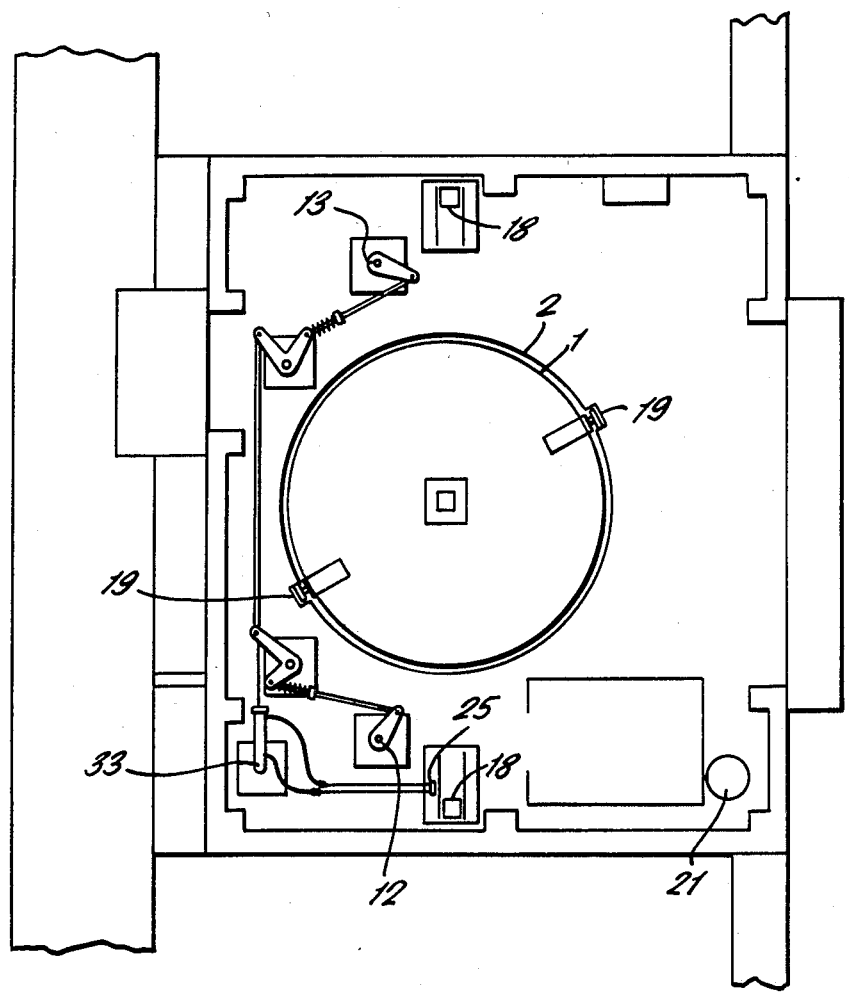
FIG. 5 is a plan view at ground level of the engine of FIGS. 1 and 2.

The valves 10 and 11 are opened and closed by their respective actuating lever arms 12 and 13, as shown in FIG. 5. The arms 12 and 13 are connected up in a crank arrangement, and the whole arrangement is actuated by means of a double-acting hydraulic ram 33. Each arm 12 and 13 could alternatively, of course, be operated by its own hydraulic ram. This crank arrangement, however, is a convenient way of ensuring consistent tuning of valve opening and closing, in this case with the open valve always closed before the closed valve is opened.

Figure 3:
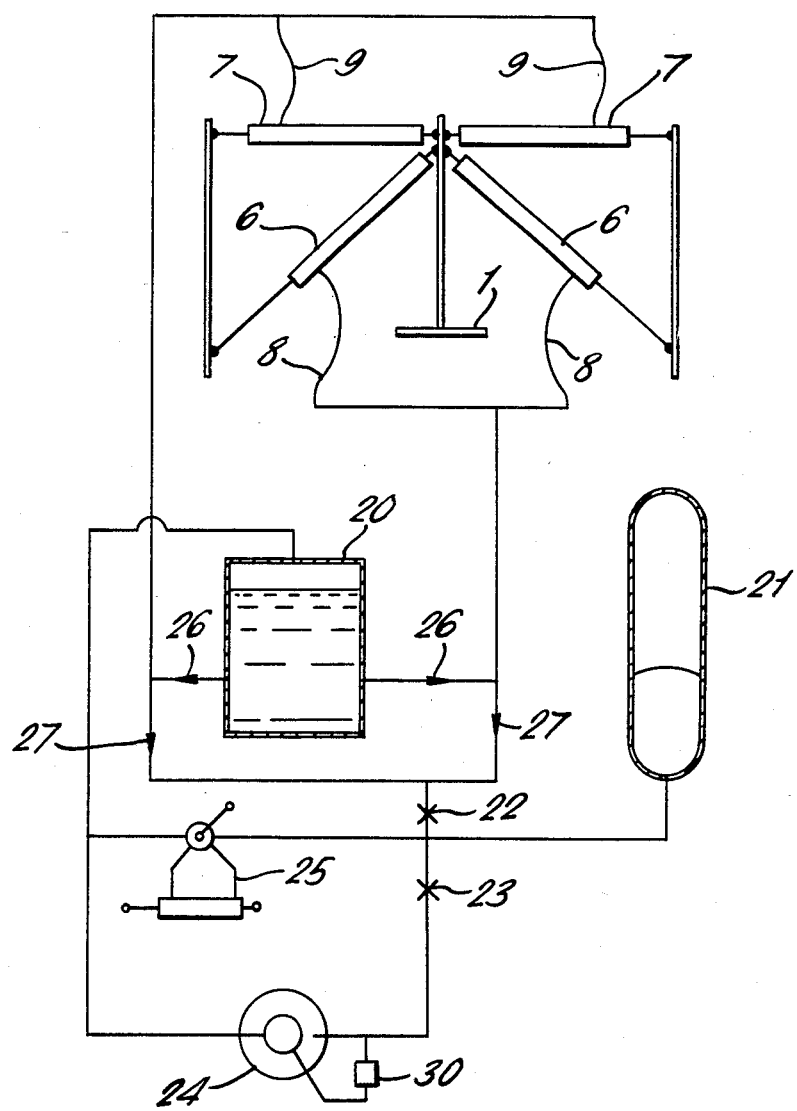
FIG. 3 is a diagram of a hydraulic circuit, suitable for utilisation with the apparatus in FIGS. 1 and 2, FIGS. 4(a) to 4(f) are schematic diagrams showing the operating cycle of the apparatus of FIGS. 1 and 2.

FIG. 3 is a schematic diagram of a simple hydraulic circuit suitable for extracting useful work from the hydraulic rams. As the float 1 rises or falls, one pair of rams is caused to extend, drawing hydraulic fluid from a reservoir 20 through a non-return valve 26. At the same time, the other pair of rams is caused to contract delivering hydraulic fluid under pressure through a non-return valve 27.

In this embodiment, hydraulic rams 6 and 7 are single-acting and thus both the drawing and delivery of hydraulic fluid takes place alternately through fluid lines 8 and 9.

This particular hydraulic circuit comprises a hydraulic accumulator 21, connectable with the rams 6 and 7 through valve 22 and a hydraulic swash plate motor 24, connectable with the rams 6 and 7 through valve 23. When valve 22 is open, hydraulic fluid is delivered under pressure from the contracting pair of rams to the accumulator 21, causing it to pressurise. The motor 24 can be driven by the hydraulic fluid being delivered under pressure from the contracting pair of rams if valve 23 is open. The motor 24, which may be used to generate electricity or drive machinery, has a swash control 30 which opens and closes the swash plates. The accumulator 21 in this circuit has the effect of smoothing the variations in the hydraulic pressure available for driving the motor 24. The hydraulic pressure can also be used to operate linear actuators in hydraulic presses, for example. As an alternative to this circuit, the hydraulic pressure could be used without the accumulator to drive a motor with a suitable flywheel or similar arrangement. Or, the engine may be used for driving a fluid such as water, for example, to a higher altitude, perhaps for irrigation purposes, or the high pressure water could be used to drive a pelton wheel for generating power.

The engine can be stopped by simply closing valve 22. When valve 22 is closed, the hydraulic pressure builds up in the contracting pair of rams to such an extent that the float 1 is prevented from moving any further. It will be appreciated that with valve 22 open, the accumulator has the same sort of effect. Here, the engine will be halted when the hydraulic pressure has built up to a similar extent in the accumulator 21 and the engine will not restart until fluid is drawn off.

A typical operating cycle of the apparatus is shown schematically in FIGS. 4(a) to 4(f). At 4(a) float 1 is in its lowermost position, and the upstream valve 11 is opening, the lower pair of hydraulic rams 6 are fully compressed, the upper pair 7 fully extended. The annulus formed between the float and the chamber wall quickly fills with water on opening of the upstream valve 11 to the upstream level 16, which subjects the float to an increased buoyancy force. At this point, there is a net upward force on the float which net force is at its maximum, and the component of that net force transmitted to hydraulic rams 7 is also at a maximum.

FIG. 4(b) shows the float rising under the net upward force. Work is being done on hydraulic fluid in the upper pair of rams 7 as the rams shorten, and hydraulic fluid is being drawn into the lower pair of rams 6 as the rams 6 extend. Because less of the float is now submerged, the buoyancy force is less. At the same time, however, the rams 7 have pivoted about their ends on supports 14 such that the vertical component of the force exerted by the pressurised fluid in rams 7 acting in opposition to the rising float is correspondingly less. As a corollary of this, it will be seen that the work available from the float per unit length of its stroke will decrease steadily as the float travels from beginning to end of its stroke, and the work required in shortening the rams per unit length of stroke of the float will also decrease as the float travels from beginning to end of its stroke.

In FIG. 4(c), the float has reached the top of its stroke, and rams 7 are substantially at right angles to the direction of movement of the float. The rams 7 are now fully compressed, the lower pair 6 being fully extended and filled with hydraulic fluid. In this position, hydraulic switch 25 is actuated, operating hydraulic ram 33, which causes actuating arms 12 and 13 to rotate, closing the upstream valve 11 before opening the downstream valve 10. It will be noted here that it is convenient to use part of the hydraulic fluid which has been pressurised by the hydraulic rams 7 to operate hydraulic ram 33.

In FIG. 4(d), the upstream valve 11 has closed fully, and the downstream valve 10 is opening, thus lowering the water level in the annulus around the float to the downstream level 17. At this point, the buoyancy force, which acts on the float in opposition to the gravitational force on the float, is at a minimum. Thus, there is a net downward force on the float which net force is at its maximum, and the component of that net force transmitted to the hydraulic rams 6 is also at a maximum.

FIG. 4(e) shows the float falling under the net downward force. Hydraulic fluid is being drawn into hydraulic rams 7 as they extend whilst being compressed by rams 6 as they contract. It can be seen that the interaction of the falling float and hydraulic rams 6 is analogous to that of the rising float and hydraulic rams 7.

In FIG. 4(f) the float is back in its lowermost position, and hydraulic switch 25 is actuated causing the downstream valve 10 to close. When downstream valve 10 is closed, upstream valve 11 starts to open and the cycle begins again.

The foregoing description of a typical cycle of operation uses a pseudo-static analysis; it will be appreciated that in practice dynamic effects render the analysis complex, but the basic stages of an operating cycle are as described.

Although the invention has been described above specifically with reference to a hydraulic system, it should be understood that other fluid systems such as pneumatic systems may be utilised.

It should also be understood that any number of such floats and chambers may be arranged to work together for a common power output.

Machines according to the invention may incorporate any of the additional features disclosed in my British Pat. Nos. 1484721 and 1517643, the entire contents of which should be considered to be included herein by reference.

Machines according to the invention may be utilised in any of the applications disclosed in either of the aforesaid British patent specifications, and in particular are useful in tidal and river applications.

I claim:

1. An engine for deriving energy from a head of water, comprising a chamber having a vertical longitudinal direction, a float mounted for up and down linear reciprocal movement within the chamber and having a central axis and occupying substantially all the chamber volume, means for alternately admitting water into the chamber from an upper water level and allowing the water to flow out from the chamber to a lower water level to cause the float to alternately rise and fall, the draft of the float and its height above the waterline in static equilibrium being greater than the difference in height between the upper and lower water levels in the chamber, and means to provide a supply of fluid under pressure comprising a piston and cylinder device operable to work on the fluid on relative movement of the piston within the cylinder, the piston and cylinder device being pivotally connected between, at a first end, a point on the float or on a member reciprocable with the float and, at a second end, a second point coupled to said chamber or to a member fixedly attached to said chamber and which is not reciprocable with the float, the second pivotal end connection being spaced from the vertical line of reciprocation of the first pivotal end connection and the central axis of said float, whereby the reciprocal movement of the float causes relative movement of the piston within the cylinder, while causing the pivotal movement of the piston and cylinder device about the second point, said first pivotal end connection being substantially aligned along the central axis of said float during said reciprocal movement of said float, said float defining a cross sectional area, said piston and cylinder device being disposed such that said first end is arranged within said area defined by said float and said second end is arranged outside said area.

2. An engine as claimed in claim 1, wherein the position of the second pivotal end connection is such that during the working stroke of the float, the piston and cylinder device is caused to pivot about the second pivotal end connection and there is progressively less shortening of the piston and cylinder device per unit travel of the float.

3. An engine as claimed in claim 1, wherein the vertical position of the second pivotal end connection is adjustable with respect to the extreme upper and lower positions of the float.

4. An engine as claimed in claim 1, including at least a pair of the said piston and cylinder devices, arranged such that one of the pair is in compression while the other is in extension.

5. An engine as claimed in claim 1, including two of the said piston and cylinder devices, their respective second pivotal end connections being spaced on opposite sides of the said line of reciprocation.

6. An engine as claimed in claim 4 including four piston and cylinder devices disposed as two opposite pairs, such that one pair is extended as the other pair is compressed.

7. An engine as claimed in claim 1, wherein the piston and cylinder device comprises a single-acting hydraulic ram.

8. An engine as claimed in claim 1, including an inlet valve to control entry of water from the head of water into the chamber, an outlet valve for controlling outlet of water from the chamber, and float operated means for controlling the operation of the inlet and outlet valves in response to the position of the float in the chamber, to cause the water level to rise and fall alternately to operate the float.

9. An engine as claimed in claim 1, comprising guide means for guiding the float during travel in the chamber.

10. An engine as claimed in claim 8, wherein energy derived from the rise and fall of the float is utilized to operate the inlet and outlet valves.

11. An engine as claimed in claim 8, wherein part of the pressurized fluid from said supply of fluid under pressure is utilized to operate the inlet and outlet valves.

12. An engine as claimed in claim 1, wherein the float is halted when the pressure of the pressurized fluid is greater than or equal to the supply pressure to the fluid.

13. An engine for deriving energy from a head of water, comprising a chamber having a vertical longitudinal direction, a float mounted for up and down linear reciprocal movement with the chamber and having a central axis, means for alternately admitting water into the chamber from an upper water level and allowing the water to flow out from the chamber to a lower water level to cause the float to alternately rise and fall, and means to provide a supply of fluid under pressure comprising at least a pair of piston and cylinder devices, operable to work on the fluid on relative movement of the pistons within their respective cylinders, the piston and cylinder devices being pivotally connected between, at a first end, a point on the float or on a member reciprocable with the float and, at a second end, a second point coupled to said chamber or to a member fixedly attached to said chamber and which is not reciprocable with the float, the second pivotal end connection being spaced from the vertical line of reciprocation of the first pivotal end connection and the central axis of said float, whereby the reciprocal movement of the float causes relative movement of the piston within the cylinder, while causing pivotal movement of the piston and cylinder device about the second point, said first pivotal end connection being substantially aligned along the central axis of said float during said reciprocal movement of said float, said piston and cylinder devices being arranged such that one of the pair is in compression while the other is in extension.

14. An engine as claimed in claim 13 including four piston and cylinder devices disposed as two opposite pairs, such that one pair is extended as the other pair is compressed.

15. An engine for deriving energy from a head of water, comprising an upright chamber for containing water, a float in said chamber, said float occupying substantially all the chamber volume, means mounting the float for up and down linear reciprocal movement with the chamber, inlet means for admitting water from an upper water level into the chamber below the level of the float, outlet means for allowing water to flow out of the chamber to a lower water level, valve means to control opening and closing of the inlet and outlet means in turn to allow water to alternately enter into and empty from the chamber and cause alternate rising and falling motion of the float, the draft of the float and its height above the waterline in static equilibrium being greater than the difference in height between the upper and lower water levels in the chamber, a piston and cylinder device having a first end and a second end, means pivotably connecting said first end to the float, or to a member mounted on the float, thereby allowing said frist end to reciprocate with the float, and means pivotably connecting said second end to the chamber or to a member mounted on the chamber and not reciprocable with the float, whereby the rising and falling motion of the float causes relative movement between the piston and cylinder of the device, a fluid circuit connected to the device, which fluid circuit is supplied with fluid under pressure from the device through relative movement between its piston and cylinder, and further comprising means mounting said second pivotal end connection at a position spaced from the line of reciprocation of said first pivotal end connection such that during a working stroke of the float, the device is caused to pivot relative to the float and chamber and there is progressively less relative movement between the piston and cylinder of the device per unit travel of the float, said float defining a cross-sectional area, said piston and cylinder device being disposed such that said first end is arranged within said area defined by said float and said second end is arranged outside said area.

* * * * *